United States Patent
Ueda et al.

(10) Patent No.: US 10,845,058 B2
(45) Date of Patent: Nov. 24, 2020

(54) HEATING COOKER

(71) Applicant: SHARP KABUSHIKI KAISHA, Sakai (JP)

(72) Inventors: Shinya Ueda, Sakai (JP); Masayuki Uno, Sakai (JP); Masayuki Iwamoto, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 180 days.

(21) Appl. No.: 16/073,129

(22) PCT Filed: Jan. 26, 2017

(86) PCT No.: PCT/JP2017/002765
§ 371 (c)(1),
(2) Date: Jul. 26, 2018

(87) PCT Pub. No.: WO2018/042696
PCT Pub. Date: Mar. 8, 2018

(65) Prior Publication Data
US 2019/0024904 A1    Jan. 24, 2019

(30) Foreign Application Priority Data
Aug. 29, 2016   (JP) ................. 2016-167322

(51) Int. Cl.
*A21B 1/00* (2006.01)
*F24C 7/06* (2006.01)
(Continued)

(52) U.S. Cl.
CPC ............... *F24C 7/06* (2013.01); *A47J 37/075* (2013.01); *A47J 37/08* (2013.01); *A47J 37/0871* (2013.01);
(Continued)

(58) Field of Classification Search
CPC .. F24C 7/04; F24C 7/043; F24C 7/046; F24C 7/06; F24C 7/062; F24C 7/065;
(Continued)

(56) References Cited

U.S. PATENT DOCUMENTS 5,158,064 A    10/1992 Willis et al.
5,619,983 A    4/1997 Smith
(Continued)

FOREIGN PATENT DOCUMENTS

CN    201218542 Y    4/2009
CN    102112811 A    6/2011
(Continued)

OTHER PUBLICATIONS

Notification of Reasons for Refusal issued against Japan Patent Application No. 2017-079950 dated Dec. 26, 2017.
(Continued)

*Primary Examiner* — Hung D Nguyen
(74) *Attorney, Agent, or Firm* — ScienBiziP, P.C.

(57) ABSTRACT

Provided is a heating cooker that can efficiently apply steam to the entire food and can also cook the food quickly. A heating cooker (1A) includes a toasting grill (16) provided within a cooking chamber (10) and a lower heater (17*b*) provided at a lower section within the cooking chamber (10). Steam is blown between the toasting grill (16) and the lower heater (17*b*) from a steam outlet (25) provided in at least one sidewall of the cooking chamber (10).

6 Claims, 6 Drawing Sheets

(51) Int. Cl.
*A47J 37/08* (2006.01)
*A47J 37/07* (2006.01)
*F24C 7/04* (2006.01)
*F24C 13/00* (2006.01)
F24C 15/00 (2006.01)
F24C 15/32 (2006.01)

(52) U.S. Cl.
CPC ............. *F24C 7/04* (2013.01); *F24C 13/00* (2013.01); *F24C 15/003* (2013.01); *F24C 15/327* (2013.01)

(58) Field of Classification Search
CPC .. F24C 7/067; F24C 7/08; F24C 7/082; F24C 7/087; F24C 13/00; F24C 15/003; F24C 15/006; F24C 15/023; F24C 15/16; F24C 15/162; F24C 15/32; F24C 15/327; A47J 27/004; A47J 27/04; A47J 37/06; A47J 37/0623; A47J 37/0629; A47J 37/0635; A47J 37/0664; A47J 37/0676; A47J 37/075; A47J 37/08; A47J 37/0871; H05B 6/062; H05B 6/065; H05B 6/12; H05B 6/1209; H05B 6/1236; H05B 6/1245; H05B 6/129
USPC ........ 219/391, 395, 400, 401–411, 620, 622, 219/624, 627, 667, 675
See application file for complete search history.

(56) References Cited

U.S. PATENT DOCUMENTS

| | | |
|---|---|---|
| 9,060,523 B1 | 6/2015 | Buller-Colthurst |
| 2004/0159317 A1 | 8/2004 | Walther et al. |
| 2011/0146653 A1 | 6/2011 | Kitatani |
| 2013/0118470 A1 | 5/2013 | Armstrong et al. |
| 2013/0156906 A1 | 6/2013 | Raghavan et al. |
| 2013/0259455 A1 | 10/2013 | Schootstra et al. |
| 2016/0029841 A1 | 2/2016 | Walker |
| 2017/0059171 A1 | 3/2017 | Kitayama et al. |
| 2017/0319006 A1 | 11/2017 | Niizumi |
| 2018/0235239 A1 | 8/2018 | Reese et al. |
| 2020/0182481 A1 | 6/2020 | Bhogal et al. |

FOREIGN PATENT DOCUMENTS

| | | | |
|---|---|---|---|
| CN | 103080654 A | | 5/2013 |
| CN | 203226682 U | | 10/2013 |
| CN | 103884030 A | | 6/2014 |
| CN | 105342490 A | | 2/2016 |
| JP | S57-121802 U | | 7/1982 |
| JP | H03-164125 A | | 7/1991 |
| JP | 2005-077019 A | | 3/2005 |
| JP | 2005-77019 A | * | 3/2005 |
| JP | 2005-077020 A | | 3/2005 |
| JP | 2007-093091 A | | 4/2007 |
| JP | 2007-132566 A | | 5/2007 |
| JP | 2007-232270 A | * | 9/2007 |
| JP | 2007-232270 A | | 9/2007 |
| JP | 2009-250494 A | | 10/2009 |
| JP | 2011-047612 A | | 3/2011 |
| JP | 2011-163719 A | | 8/2011 |
| JP | 2011-243320 A | * | 12/2011 |
| JP | 2012-052703 A | | 3/2012 |
| JP | 2014-211246 A | | 11/2014 |
| JP | 2015-135235 A | | 7/2015 |
| JP | 2016-031156 A | | 3/2016 |
| TW | I382827 B | | 1/2013 |
| WO | 2016/117667 A1 | | 7/2016 |

OTHER PUBLICATIONS

Co-pending letter regarding a related U.S. Appl. No. 16/078,236.
Co-pending letter regarding a related U.S. Appl. No. 16/078,402.
Non-Final Office Action dated Jun. 18, 2020 for U.S. Appl. No. 16/078,402.

* cited by examiner

HEATING COOKER

TECHNICAL FIELD

The present invention relates to heating cookers for heating and cooking food.

BACKGROUND ART

In the related art, heating cookers such as toaster ovens that heat and cook food disposed within cooking chambers are widely available.

Normally, a toaster oven includes a heater within the cooking chamber and uses the heater to heat the food. In a case where bread is toasted in such a toaster oven, the entire bread in the toasted state tends to become firm due to moisture removed therefrom.

A known heating cooker that prevents such a situation toasts bread by using a heater and also applies steam to the bread to give the bread a soft finish, as disclosed in Patent Literature 1. Specifically, in the configuration described in Patent Literature 1, bread placed on a receiver plate is toasted by being pressed against a hot plate containing a heater, and during the bread toasting process, steam is fed between the hot plate and the receiver plate from a steam generating unit. Subsequently, the steam travels below the lower surface of the hot plate and is released outward through a lower gap of a door. This prevents the entire bread in the toasted state from becoming firm.

CITATION LIST

Patent Literature

PTL 1: Japanese Unexamined Patent Application Publication No. 3-164125 (Jul. 16, 1991)
PTL 2: Japanese Unexamined Patent Application Publication No. 2014-211246 (Nov. 13, 2014)

SUMMARY OF INVENTION

Technical Problem

However, in the configuration disclosed in Patent Literature 1, the steam is not fed to the surface of the bread in contact with the hot plate, such that the steam is fed only to one surface of the bread (food). Therefore, it is not possible to cause the steam to circulate around the entire bread (food). This is problematic in that the situation where the entire bread in the toasted state becomes firm cannot be prevented.

The present invention has been made in view of the above-described problem in the related art, and an object thereof is to provide a heating cooker that can efficiently apply steam to the entire food and that can also cook the food quickly.

Solution to Problem

In order to solve the aforementioned problems, a heating cooker according to an aspect of the present invention includes: a food placement section provided within a cooking chamber; a lower heating member that is provided at a lower section within the cooking chamber and that heats food placed on the food placement section from below; and a steam generating unit that has a steam outlet in at least one sidewall of the cooking chamber and that blows steam between the food placement section and the lower heating member from the steam outlet.

Advantageous Effects of Invention

The aspect of the present invention is advantageous in that it can efficiently apply steam to the entire food and can also cook the food quickly.

DESCRIPTION OF EMBODIMENTS

First Embodiment

Figure 3:
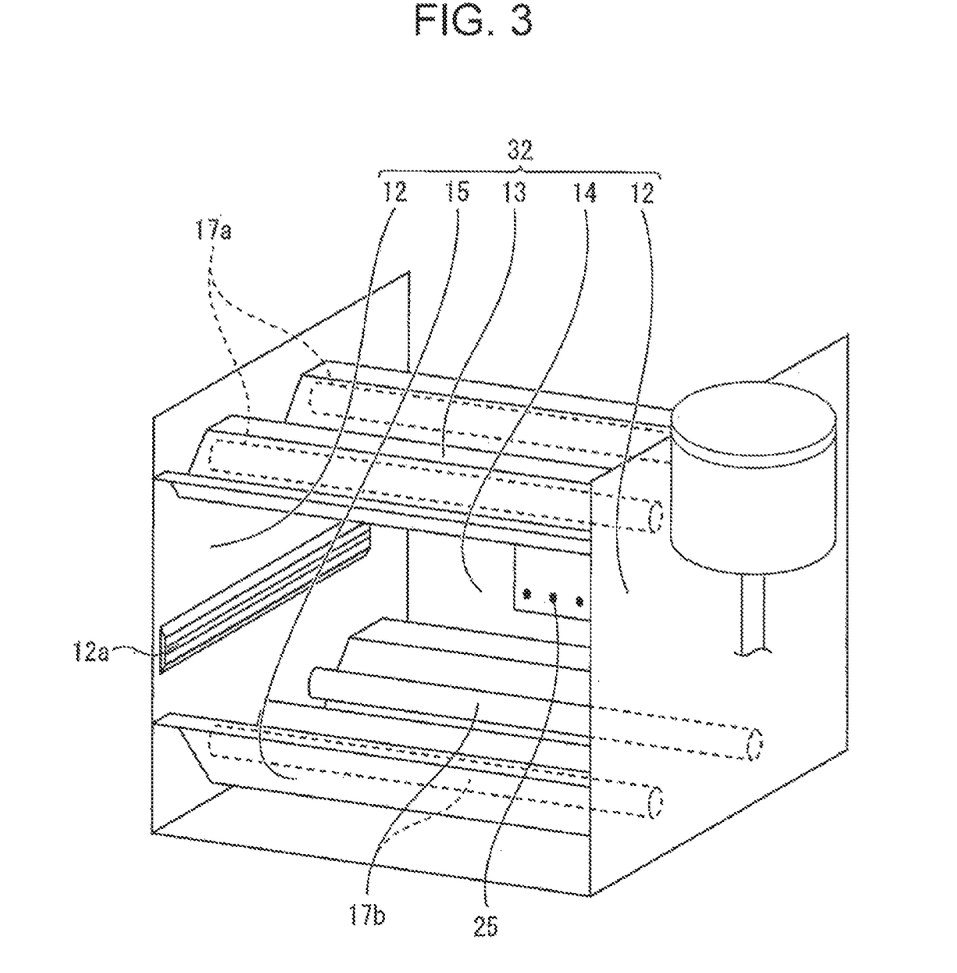
FIG. 3 is a perspective view illustrating the internal structure of the heating cooker shown in FIG. 1 in a state where a front door is removed and a toasting grill is not disposed.

An embodiment of the present invention will be described below based on the drawings. The following description of this embodiment relates to an example where a heating cooker according to the present invention is applied to a toaster oven. In order to provide an easier understanding of the structure of the heating cooker, FIG. 3 illustrates a state where, for example, a door and a housing of the heating cooker have been removed.

(Configuration of Heating Cooker)

Figure 1:
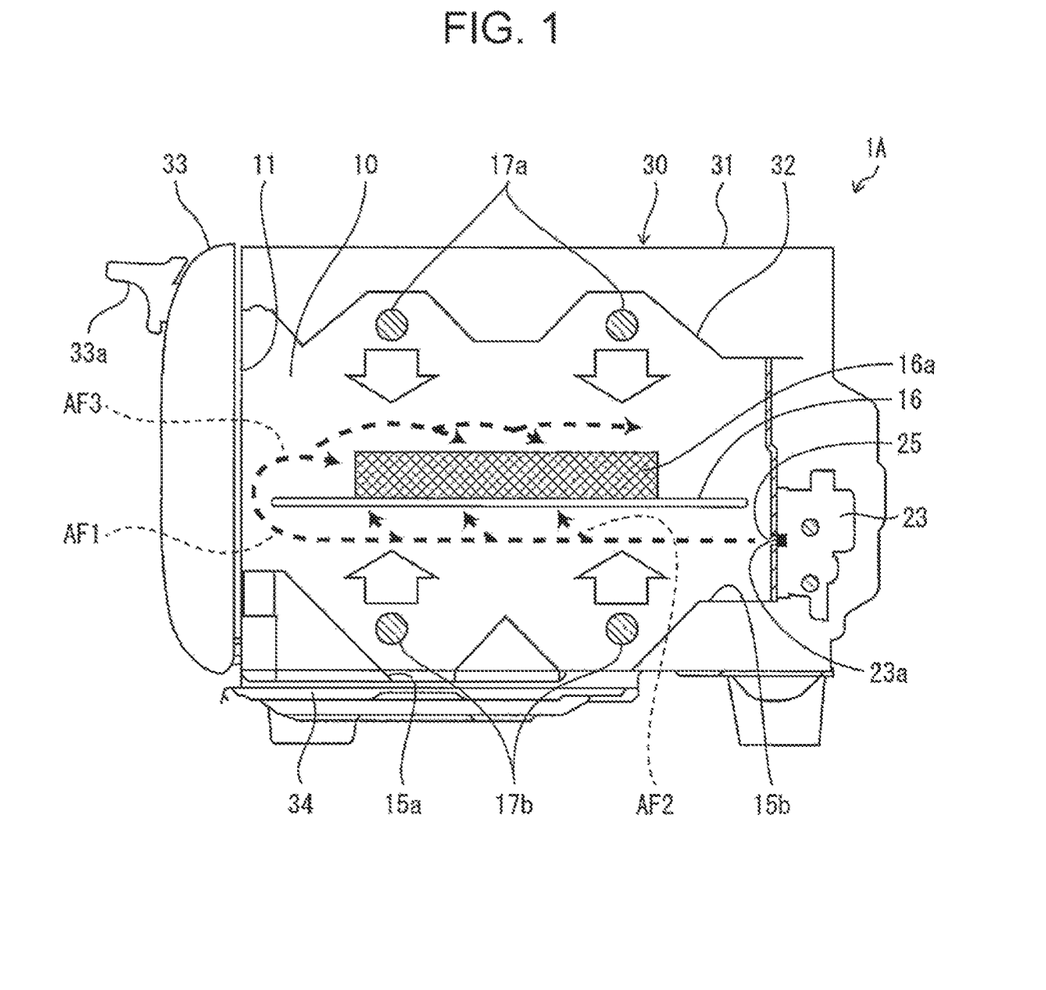
FIG. 1 is a cross-sectional view illustrating a schematic configuration of a heating cooker according to a first embodiment of the present invention.

FIG. 1 is a cross-sectional view illustrating a schematic configuration of a heating cooker 1A according to this embodiment.

As shown in FIG. 1, the heating cooker 1A includes a cooking chamber 10 serving as a space for cooking food, a steam generator 23 (steam generating unit) that generates steam or superheated steam, and a housing 30 that accommodates the above components. Superheated steam is high-temperature steam obtained by further heating steam. The expression "steam or superheated steam" used in this description may include any one of steam, superheated steam, and vapor containing a mixture of steam and superheated steam.

The heating cooker 1A has an inner wall 32 inside an outer wall 31 constituting the housing 30, and the interior of the inner wall 32 serves as the cooking chamber 10. The front surface of the cooking chamber 10 is provided with an opening 11 through which food can be taken in and out. Specifically, the cooking chamber 10 is surrounded by left and right sidewalls, a rear wall at the rear, a top wall, and a bottom wall that constitute the inner wall 32.

The front surface of the heating cooker 1A is provided with a front door 33 (openable-closable door) for opening and closing the opening 11. For example, the front door 33 is attached in a vertically rotatable manner about the bottom thereof and blocks the opening 11 when the front door 33 is closed. The front door 33 is provided with a handle 33a. For example, a midsection of the front door 33 may be provided with an observation door formed of heat-resistant glass.

A toasting grill 16 (food placement section) for placing food to be cooked thereon, such as bread 16a (food), is provided inside the cooking chamber 10. For example, two loaves of bread 16a can be horizontally placed side-by-side on the toasting grill 16.

Two upper heaters 17a (upper heating members) and two lower heaters 17b (lower heating members) are respectively provided at an upper section and a lower section of the cooking chamber 10 (i.e., a position above the toasting grill 16 and a position below the toasting grill 16). The upper heaters 17a and the lower heaters 17b may together be simply referred to as heaters hereinafter.

The upper heaters 17a heat the bread 16a from above, and the lower heaters 17b heat the bread 16a from below.

For example, the two upper heaters 17a and the two lower heaters 17b are arranged in the front-rear direction of the cooking chamber 10, are disposed parallel to one another, and extend in the lateral direction, which is the longitudinal direction of the heating cooker 1A, that is, the direction in which the loaves of bread 16a are arranged.

The upper heaters 17a and the lower heaters 17b are, for example, ceramic heaters. The upper heaters 17a and the lower heaters 17b may alternatively be, for example, glass or sheathed heaters. The type and performance of the heaters are not particularly limited. Moreover, the number of heaters is also not particularly limited.

It can be regarded that the heaters are provided in an exposed manner within the cooking chamber 10. The expression "the heaters are provided in an exposed manner within the cooking chamber 10" implies that, for example, glass or sheathed heaters are installed in an uncovered state within the cooking chamber 10 without being covered by protective tubes. In other words, as one mode, for example, reflective mirrors are provided between the heaters and the toasting grill 16 such that the heaters are not visually recognizable by users.

Furthermore, the bottom wall of the cooking chamber 10 is provided with a bottom-wall opening 15a, and a tray-like food crumb receiver 34 is provided below the cooking chamber 10. The food crumb receiver 34 is positioned below the bottom-wall opening 15a when the food crumb receiver 34 is in accommodated below the cooking chamber 10, and can be drawn out forward of the heating cooker 1A.

The steam generator 23 is installed in an intermural region that is located between the outer wall 31 and the inner wall 32 and that serves as a space separate from the cooking chamber 10. In the example in FIG. 1, the steam generator 23 is provided in the intermural region and on the rear wall at the rear of the cooking chamber 10. The rear wall is provided with a steam outlet 25 that blows the steam or superheated steam generated by the steam generator 23 into the cooking chamber 10.

The steam generator 23 has a steam ejection port 23a that ejects the steam or superheated steam, and the steam ejection port 23a is installed in alignment with the steam outlet 25.

(Steam Feed Unit)

FIG. 2(a) is a perspective view schematically illustrating an internal structure in a case where the heating cooker 1A according to this embodiment is viewed from the upper rear side. FIG. 2(b) is a rear view schematically illustrating the internal structure of the heating cooker 1A.

Figure 2:
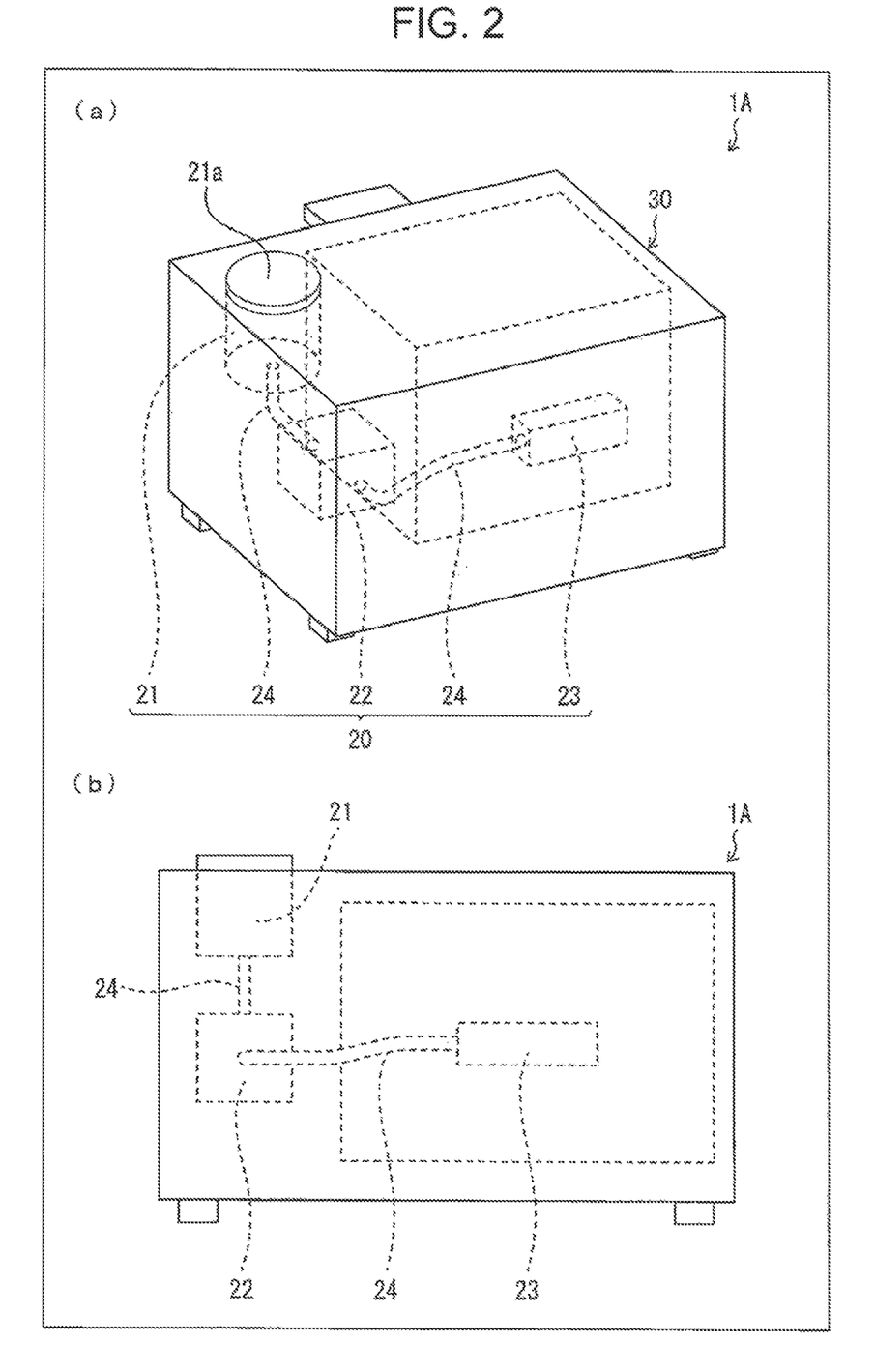
FIG. 2(a) is a perspective view schematically illustrating an internal structure in a case where the heating cooker shown in FIG. 1 is viewed from the upper rear side.
FIG. 2(b) is a rear view schematically illustrating the internal structure of the heating cooker.

As shown in FIG. 2, the heating cooker 1A includes a steam feed unit 20 that is accommodated in the intermural region between the outer wall 31 and the inner wall 32 and that feeds the steam or superheated steam to the cooking chamber 10. The steam feed unit 20 includes a water tank 21 that retains water, a pump 22 that conveys the water from the water tank 21, and the steam generator 23 that generates the steam or superheated steam by using the conveyed water. The water tank 21, the pump 22, and the steam generator 23 are connected by a feed pipe 24 through which the water flows.

For example, the water tank 21 is installed in an embedded manner in the upper section of the housing 30 so as to protrude into the aforementioned intermural region. Specifically, a recessed-shape water tank receiver is provided in the upper section of the housing 30, and the water tank 21 is inserted into this water tank receiver from above. Although the installation mode and the position of the water tank 21 are not particularly limited so long as the water tank 21 can retain water poured therein by a user, the above installation mode can allow the heating cooker 1A to have a shape with a small number of protrusions.

A tank lid 21a is provided on the upper surface of the water tank 21. A user can pull out the water tank 21 from the water tank receiver, remove the tank lid 21a, and pour water into the water tank 21. The water retained in the water tank 21 is conveyed to the steam generator 23 via the feed pipe 24 by driving the pump 22.

(Cooking Chamber)

FIG. 3 is a perspective view illustrating the internal structure of the heating cooker 1A in a case where the heating cooker 1A is viewed from the upper front side in a state where the front door 33 is removed and the toasting grill 16 is not disposed. In FIG. 3, the pump 22 and the feed pipe 24 are not shown.

As shown in FIG. 3, the inner wall 32 constituting the cooking chamber 10 has left and right sidewalls 12 (at least one sidewall), a top wall 13, a rear wall 14 (at least one sidewall), and a bottom wall 15.

The left and right sidewalls 12 are provided with guide grooves 12a extending in the front-rear direction, and the side edges of the toasting grill 16 are fitted in the guide grooves 12a. Thus, the toasting grill 16 is movable in the front-rear direction of the heating cooker 1A by being guided along the guide grooves 12a. The toasting grill 16 may be connected to the front door 33 so as to be drawn out from and pushed back into the cooking chamber 10 together with the opening-closing operation of the front door 33. In other words, a driving mechanism (food-placement-section driver) that moves the toasting grill 16 (food placement section) together with the opening-closing operation of the front door 33 may be provided. An example of such a configuration will be described later as a modification of this embodiment.

The steam outlet 25 includes, for example, four circular holes provided in the rear wall 14 of the cooking chamber 10.

(Steam Outlet)

The steam outlet 25 will be described below with reference to FIG. 1 again.

The steam outlet 25 according to this embodiment allows the cooking chamber 10 and the steam ejection port 23a of the steam generator 23 to directly communicate with each other. In other words, in the steam generator 23, the steam ejection port 23a is installed in alignment with the steam outlet 25. Therefore, steam or superheated steam is directly ejected into the cooking chamber 10 from the steam generator 23 via the steam outlet 25.

In the height direction within the cooking chamber 10, the steam outlet 25 is provided at a height between the lower heaters 17b and the toasting grill 16. The steam outlet 25 is configured to blow the steam or superheated steam between the lower heaters 17b and the toasting grill 16.

Furthermore, in the height direction within the cooking chamber 10, the steam outlet 25 is preferably provided at a height closer to the toasting grill 16 than to the lower heaters 17b. This is because the steam or superheated steam can be fed to, for example, the bread 16a as food more efficiently while damages to the lower heaters 17b are further suppressed.

(Other Configuration of Heating Cooker)

A steam guide 15b that guides the steam or superheated steam, which is blown out and diffuses from the steam outlet 25 and travels downward, between the lower heaters 17b and the toasting grill 16 is provided below the steam outlet 25 within the cooking chamber 10. In the example in FIG. 1, the steam guide 15b constitutes a part of the bottom wall 15 and is a flat surface extending horizontally from the bottom of the rear wall 14 to the front of the cooking chamber 10. In the area between the bottom of the rear wall 14 to the lower heaters 17b, the steam guide 15b is provided at a height between the lower heaters 17b and the steam outlet 25.

The steam guide 15b is not particularly limited in shape so long as it can guide the diffusing and downward-traveling steam or superheated steam. The steam guide 15b may be, for example, a flat surface inclined downward from the front (i.e., the side provided with the front door 33) toward the rear (i.e., the side with the rear wall 14) within the cooking chamber 10, or may be a curved surface curved from the bottom of the rear wall 14 toward the toasting grill 16.

(Operation of Heating Cooker)

The operation of the heating cooker 1A having the above-described configuration will be described below with reference to FIG. 1 again. In order to toast both surfaces of the bread 16a placed on the toasting grill 16 in the heating cooker 1A, the upper heaters 17a, the lower heaters 17b, and the steam feed unit 20 are activated. In this case, electric power is supplied to these units from a power source (not shown).

The water tank 21 of the steam feed unit 20 is capable of retaining, for example, 40 cc of water therein. The heating cooker 1A is configured to use 20 to 40 cc of water in one cooking process. A user supplies water to the water tank 21 before every cooking process. In this case, it is preferable from a hygienic standpoint that the water to be used only for a single cooking process be retained in the water tank 21 so that the water is prevented from remaining in the water tank 21 or the feed pipe 24 for an extended period of time.

The steam or superheated steam generated by the steam generator 23 of the steam feed unit 20 is blown into the cooking chamber 10 via the steam outlet 25.

The steam or superheated steam blown out from the steam outlet 25 flows as main airflow AF1 between the lower heaters 17b and the toasting grill 16 from the rear toward the front of the cooking chamber 10. In this main airflow AF1, airflow that travels upward occurs owing to spontaneous diffusion and lower specific gravity than air. Consequently, secondary airflow AF2 occurs.

The secondary airflow AF2 also flows toward the upper side of the toasting grill 16 via grid openings in the toasting grill 16. As the lower heaters 17b heat the interior of the cooking chamber 10, the upward-traveling flow is further stimulated.

The main airflow AF1 reaching the front door 33 travels around the toasting grill 16 to the upper side thereof by being guided by the front door 33, so that secondary airflow AF3 diffusing to envelop the upper surface and the side surfaces of the bread 16a occurs.

Consequently, the bread 16a is enveloped by the steam or superheated steam so that the steam or superheated steam efficiently circulates around the entire bread 16a. In the steam or superheated steam blown out from the steam outlet 25, convection (not shown) other than the main airflow AF1, the secondary airflow AF2, and the secondary airflow AF3 naturally occurs.

(Advantages of Heating Cooker)

In the heating cooker 1A, the steam generator 23 blows steam or superheated steam between the toasting grill 16 and the lower heaters 17b from the steam outlet 25, so that the steam or superheated steam efficiently circulates around the entire bread 16a.

Therefore, the heating cooker 1A efficiently applies steam or superheated steam to the entire food while applying radiant heat thereto from the lower heaters 17b so as to cook the food quickly.

Furthermore, by using superheated steam, the following advantages are exhibited. Specifically, superheated steam can apply a large amount of heat to an object to be heated in accordance with heat transfer by condensation, so that the object can be heated more quickly than by hot-air convection. Moreover, since superheated steam condenses preferentially at low-temperature sections, superheated steam has an advantage in which uneven heating is suppressed.

Therefore, the heating cooker 1A blows superheated steam between the toasting grill 16 and the lower heaters 17b from the steam outlet 25, so that the entire bread 16a can be efficiently heated by not only the radiant heat from the upper heaters 17a and the lower heaters 17b but also the condensation heat from the superheated steam. In addition, since the superheated steam is further heated by the heat from the heaters, the bread 16a can be heated more efficiently.

The heating of the object to be heated by using superheated steam also has the following characteristics. Specifically, superheated steam condenses immediately as soon as it comes into contact with the object, and condensate water adheres to the object. Then, after a restoration process where moisture starts to evaporate from the surface of the object, the object starts to dry. In other words, by using superheated steam, the object can be finished to a state where the surface thereof is crispy while moisture is retained inside.

Therefore, during the toasting process of the bread 16a, water is supplied to the entire surface of the bread 16a so that evaporation of moisture within the bread 16a is prevented.

Consequently, the heating cooker 1A can efficiently apply steam to the entire food and can cook the food quickly. Specifically, the heating cooker 1A can toast, for example, the bread 16a as food within a short period of time to provide a satisfactory texture in which the surface of the bread 16a is given a toasted color with moisture removed therefrom while the inside contains moisture and is resilient. In other words, the heating cooker 1A can toast the bread 16a within a short period of time to a state where the surface of the bread 16a provides a crispy and savory texture while the inside is soft and sticky.

Furthermore, in the heating cooker 1A according to this embodiment, the steam or superheated steam is not directly ejected toward the lower heaters 17b exposed within the cooking chamber 10 or toward the bread 16a. Therefore, a situation where, for example, the glass or sheathed upper heaters 17a and lower heaters 17b, which are at a higher temperature than the steam or superheated steam, break or corrode by undergoing a local temperature change caused by the steam or superheated steam is suppressed.

In a case where superheated steam is to be blown out, the superheated steam is not directly ejected onto the bread 16a (food), so that burning of the bread 16a due to overheating is suppressed.

In the heating cooker 1A, the downward-traveling steam or superheated steam blown out from the steam outlet 25 can be properly guided between the toasting grill 16 and the lower heaters 17b by the steam guide 15b.

In the heating cooker 1A, the steam generator 23 is provided on the outer surface of the rear wall 14, and the steam or superheated steam is blown into the cooking chamber 10 via the steam outlet 25, which is provided at the position of the steam ejection port 23a, in the rear wall 14. Specifically, the steam or superheated steam generated by the steam generator 23 is directly ejected into the cooking chamber 10 by traveling along the shortest path without traveling through, for example, a steam feed pipe that conveys the steam or superheated steam. As a result, the heating cooker 1A does not require excessive components and can also reduce the risk of leakage of the steam or superheated steam to an electronic component unit as a result of breakage of, for example, a steam feed pipe. Moreover, the heating cooker can be reduced in size.

In addition, when the steam generator 23 is to generate superheated steam, the superheated steam is not cooled to become steam as it passes through a steam feed pipe immediately after the heating cooker 1A starts to perform a cooking process. Therefore, it is not necessary to heat, for example, a steam feed pipe before the heating cooker 1A starts to perform a cooking process, whereby the preparation time can be reduced. The temperature of the food in the cooking chamber 10 can be efficiently increased with a small loss in heat energy by heating using the heaters and the superheated steam, so that the food can be cooked quickly.

In the heating cooker according to the embodiment of the present invention, the upper heaters 17a are not essential components.

Furthermore, the steam generator 23 may be installed at the outer side of the left and right sidewalls 12. The steam generator 23 may be installed at a position away from the rear wall 14 or the left or right sidewall 12. In this case, a steam feed pipe may be provided between the steam ejection port 23a and the steam outlet 25. Moreover, the steam outlet 25 may be provided in either one of the left and right sidewalls 12, and may be provided in at least one of the sidewalls. Furthermore, an outlet pipe slightly protruding into the cooking chamber 10 from the steam outlet 25 may be provided.

In this embodiment, the heating cooker 1A includes the toasting grill 16 as a food placement section. Alternatively, the food placement section may be configured such that the toasting grill 16 is disposed on a holder frame.

In addition to toasting the bread 16a as food, the heating cooker 1A may be used for cooking other kinds of food, such as cooking deep-fried food and reheating tempura.

In particular, the superheated steam can efficiently transfer heat to the inside of food. Therefore, food that takes too much time to cook and thus not suitable for cooking in a conventional toaster oven only equipped with a heater can be cooked within a short period of time by using the heating cooker 1A according to this embodiment. Moreover, food can be cooked within a short period of time while being thawed.

[Modification]

Figure 4:
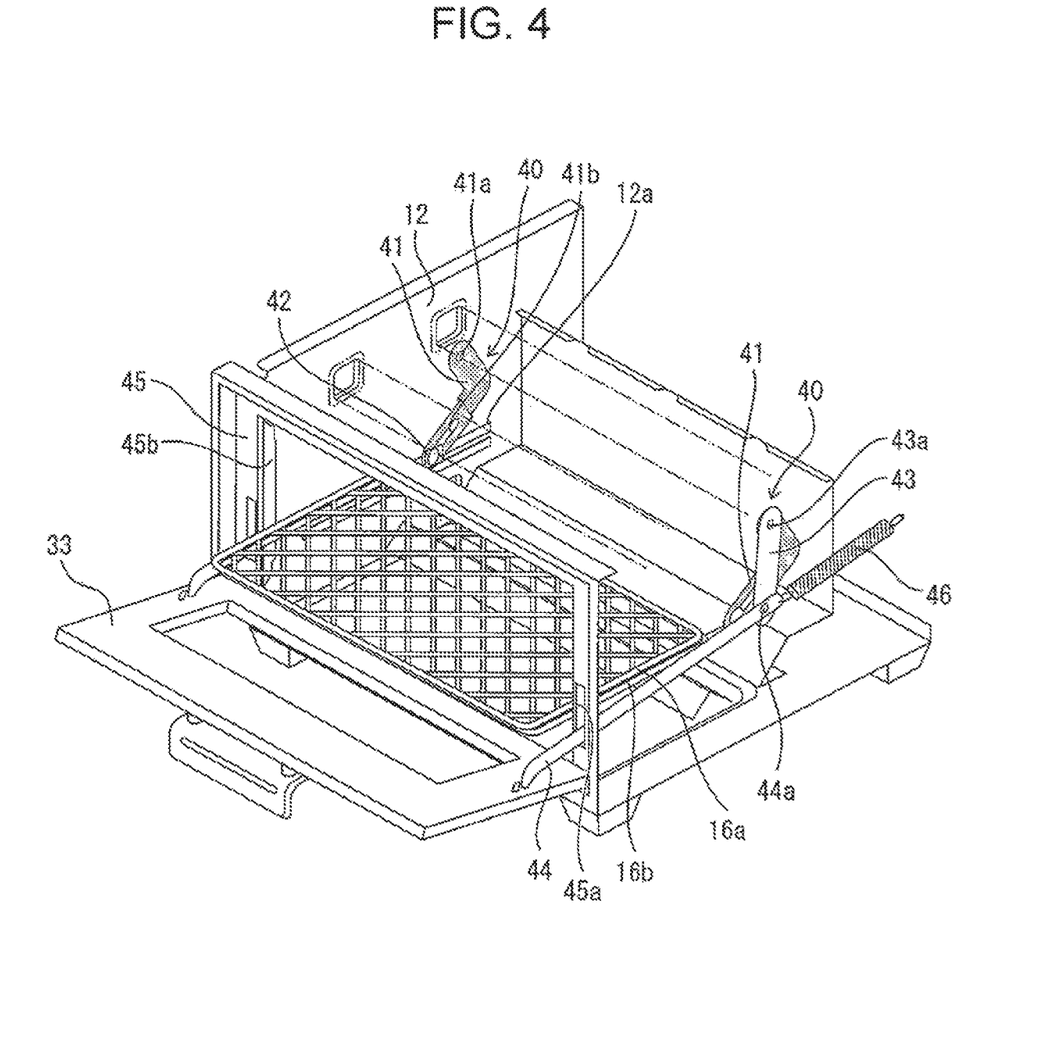
FIG. 4 is a perspective view illustrating an internal structure of a modification of the heating cooker shown in FIG. 1 in a case where the heating cooker having a holder frame on which the toasting grill is placed is viewed from the upper front side.

A modification of the present invention will be described below based on the drawings. FIG. 4 is a perspective view illustrating an internal structure of a heating cooker according to this modification in a case where the heating cooker having a holder frame on which the toasting grill is placed is viewed from the upper front side. Specifically, FIG. 4 illustrates a state where the outer wall 31, the sidewalls 12 in front of the inner wall 32, and the top wall 13 have been removed.

In this modification, the heating cooker 1A includes a driving mechanism 40 (food-placement-section driver) that moves the food placement section so that the food placement section is drawn out from and pushed back into the cooking chamber 10 together with the opening-closing operation of the front door 33. The driving mechanism 40 is merely an example, such that the heating cooker 1A may include a different driving mechanism for moving the food placement section.

As shown in FIG. 4, the heating cooker 1A according to this modification includes the driving mechanism 40, a rectangular holder frame 16b as the food placement section, and the toasting grill 16 disposed on the holder frame 16b. In a state where the holder frame 16b is guided to the guide grooves 12a, the holder frame 16b is driven by the driving mechanism 40 so as to move in the front-rear direction of the heating cooker 1A.

The driving mechanism 40 includes L-shaped levers 41, engagement members 42, straight levers 43, connector bars 44, and coil springs 46.

The L-shaped levers 41 are respectively provided along the inner surfaces of the left and right sidewalls 12 and are rotatably fixed to positions above rear sections of the guide grooves 12a. Specifically, each L-shaped lever 41 rotates about a rotation center 41a as a rotation axis provided at an upper section thereof. Each L-shaped lever 41 has an L shape such that the lower section thereof is bent forward relative to the upper section thereof, and the lower section is provided with a long hole 41b extending in the longitudinal direction of the lower section.

The engagement members 42 protrude rearward of the holder frame 16b at the left and right sides of the rear edge of the holder frame 16b and have engagement protrusions (not shown) that protrude in a direction in which the engagement protrusions face the respective sidewalls 12, that is, the L-shaped levers 41. The engagement protrusions are fitted to the long holes 41b of the L-shaped levers 41. The long holes 41b push the engagement protrusions forward when the L-shaped levers 41 rotate forward from below, and also push the engagement protrusions rearward when the L-shaped levers 41 rotate downward from the front.

The straight levers 43 are provided along the outer surfaces of the left and right sidewalls 12 at positions facing the L-shaped levers 41 via the sidewalls 12. Each straight lever 43 has a rotation center 43a that is provided at an upper section thereof and that is aligned with the rotation center 41a of the corresponding L-shaped lever 41, and the two rotation centers 43a and 41a are fixed by, for example, a bolt and a nut. Therefore, the straight levers 43 and the L-shaped levers 41 rotate together about the rotation centers 43a and 41a.

The connector bars 44 extend in the front-rear direction along the outer surfaces of the left and right sidewalls 12. The connector bars 44 have front ends that extend through a front frame 45 so as to be rotatably connected to the front door 33, and also have rear ends that are rotatably connected to the lower ends of the straight levers 43 at connection sections 44a. The areas where the connector bars 44 extend through the front frame 45 are connector-bar through-holes 45a. The connector-bar through-holes 45a are blocked by the front door 33 when the front door 33 is closed.

The coil springs 46 are provided at positions rearward of the connector bars 44 and have front ends that are connected to the rear ends of the connector bars 44 and rear ends that are connected to, for example, the rear wall sections of the outer wall of the heating cooker 1.

When the front door 33 is opened, the connector bars 44 are pulled and moved forward in accordance with the rotation of the front door 33 to the open state, thus causing the coil springs 46 to expand. When the connector bars 44 are moved forward, the straight levers 43 whose lower sections are connected to the connector bars 44 rotate forward, thus causing the L-shaped levers 41 to rotate forward together with the straight levers 43. Consequently, the engagement protrusions of the engagement members 42, that is, the holder frame 16b, are moved forward by being pushed by the L-shaped levers 41 (the ends of the long holes 41b). Thus, the holder frame 16b advances forward from the cooking chamber 10 via an opening 45b of the front frame 45. The movement of the holder frame 16b in this case is guided by the guide grooves 12a.

Accordingly, the holder frame 16b and the toasting grill 16 (food placement section) on the holder frame 16b advance forward. In this state, the toasting grill 16 can be readily disposed on the holder frame 16b, the toasting grill 16 can be readily removed, and food can be readily placed on the toasting grill 16.

Subsequently, when the front door 33 is closed from the open state, the connector bars 44 are pushed and moved rearward in accordance with the rotation of the front door 33 to the closed state, thus causing the coil springs 46 to contract. When the connector bars 44 are moved rearward, the straight levers 43 rotate rearward, thus causing the L-shaped levers 41 to rotate rearward together with the straight levers 43. Consequently, the engagement protrusions of the engagement members 42, that is, the holder frame 16b, are moved rearward by being pushed by the L-shaped levers 41 (the ends of the long holes 41b), whereby the holder frame 16b recedes into the cooking chamber 10.

Second Embodiment

Another embodiment of the present invention will be described below based on the drawings. For the sake of convenience, components having functions identical to those of the components described in the above embodiment will be given the same reference signs, and descriptions thereof will be omitted.

In the related art, a toasting grill for a heating cooker for cooking food by using superheated steam is formed of either vertical bars or horizontal bars alone. This is to cause the superheated steam to come into contact with the toasting-grill side of the food as much as possible so as to efficiently perform heating using the superheated steam and to give a toasted color to the food. Such a toasting grill is designed such that the number of grid bars forming a mesh is minimized and the pitch of the grid bars is increased as much as possible.

On the other hand, in a toaster oven in the related art, the entire bread is toasted evenly. In contrast, the finished appearance of the bread can be improved by giving a regular light-and-dark pattern (i.e., varied degrees of toasting) to the surface at the toasting-grill side of the bread, so that the quality of the food can be enhanced.

In a case where food is to be heated by using a heater and steam or superheated steam, it is demanded that the grid pitch of the toasting grill on which the food is placed be as large as possible to cause the steam or superheated steam to come into contact with the toasting-grill side of the food as much as possible and to cause the steam or superheated steam to circulate around the entire food.

However, with a large grid pitch, the entire surface of the bread is given the same toasted color and thus cannot be given a light-and-dark pattern.

This embodiment has been made in view of the problem mentioned above, and an object thereof is to provide a heating cooker including a cooking grill (toasting grill) that efficiently applies steam to the entire food while efficiently heating bread by using a heater so as to satisfactorily form a regular light-and-dark pattern on the surface of the bread.

(Findings by Inventor)

As a result of performing keen examinations, the present inventors have found that, in a heating cooker that heats food by using a heater and steam or superheated steam, the heat capacity of a cooking grill has an effect on a light-and-dark pattern (toasted color) on the surface of toasted bread and also has an effect on the texture of the bread.

Specifically, the following findings are obtained: (i) when the cooking grill has a fine mesh, the soft texture inside the toasted bread is reduced, whereas when the mesh of the cooking grill is too rough, burnt surface of the toasted bread becomes noticeable, and (ii) when the heat capacity of the cooking grill is large, the toasted color becomes lighter, whereas when the heat capacity is small, the toasted color becomes darker.

The heat capacity of the cooking grill is mainly dependent on the material, the wire diameter, and the grid pitch of the metal wires used for forming the cooking grill. Based on the above findings, these parameters are sorted out as an opening ratio, and a cooking grill 50 included in a heating cooker 1B according to this embodiment is completed.

(Configuration of Cooking Grill)

Figure 5:
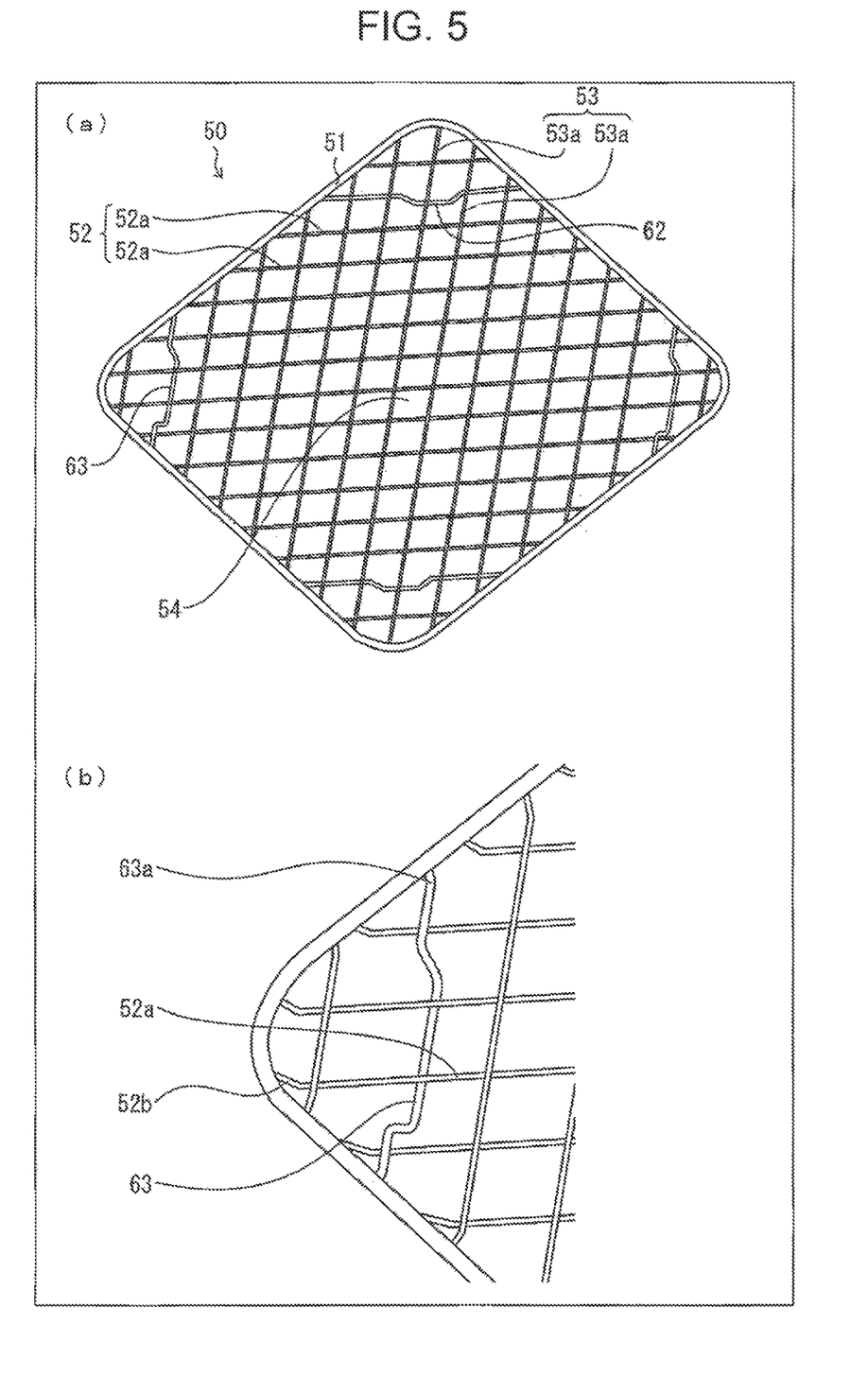
FIG. 5(a) is a perspective view illustrating an overall configuration of a cooking grill included in a heating cooker according to a second embodiment of the present invention.
FIG. 5(b) is an enlarged view of a corner section of the cooking grill in FIG. 5(a).

FIG. 5(a) is a perspective view illustrating an overall configuration of the cooking grill 50 included in the heating cooker 1B according to this embodiment. FIG. 5(b) is an enlarged view of a corner section of the cooking grill 50 in FIG. 5(a).

The heating cooker 1A shown in FIG. 1 includes the toasting grill 16 as the food placement section. In contrast, the heating cooker 1B according to this embodiment includes the cooking grill 50 as the food placement section.

As shown in FIGS. 5(a) and 5(b), the cooking grill 50 includes a support frame 51 having a rectangular shape with four rounded corners and formed of a single thick metal wire, a first metal wire group 52 in which a plurality of first metal wires 52a are arranged, and a second metal wire group 53 in which a plurality of second metal wires 53a are arranged so as to intersect with the first metal wire group 52.

The first metal wire group 52 and the second metal wire group 53 constitute a grid-shaped section 54.

For the sake of convenience, the planar direction of the support frame 51 will be defined as a horizontal direction, and a direction orthogonal to the plane of the support frame 51 will be defined as a vertical direction. Moreover, in the drawings, a direction extending toward the front will be defined as an upward direction, and a direction opposite therefrom will be defined as a downward direction.

Opposite ends of each of the plurality of metal wires included in the first metal wire group 52 and the second metal wire group 53 are fixed by being, for example, welded to the lower side of the thick metal wire serving as the support frame 51.

The first metal wires 52a and the second metal wires 53a in this embodiment are composed of chrome-plated iron. The material of the first metal wires 52a and the second metal wires 53a is not limited to this material.

The first metal wires 52a have first metal wire ends 52b serving as opposite ends thereof that are slightly inclined downward of the support frame 51 and are also lowered downward relative to the second metal wires 53a by an amount equivalent to the wire diameter of the second metal wires 53a. Specifically, with regard to the grid-shaped section 54, the second metal wires 53a are arranged so as to be constantly located at the upper side the first metal wires 52a, and the first metal wires 52a and the second metal wires 53a intersect with each other on a plane.

In other words, the first metal wires 52a and the second metal wires 53a do not have an entwined pattern where they are bent to alternately switch the positional relationship therebetween in the vertical direction. Instead, the first metal wires 52a and the second metal wires 53a constantly have the same positional relationship in the vertical direction (i.e., the second metal wires 53a are constantly located at the upper side of the first metal wires 52a).

Furthermore, the first metal wire group 52 and the second metal wire group 53 are arranged in directions in which they intersect with the edges of the support frame 51. Thus, the grid-shaped section 54 has a substantially rhombic mesh.

(Configuration of Grid-Shaped Section)

Figure 6:
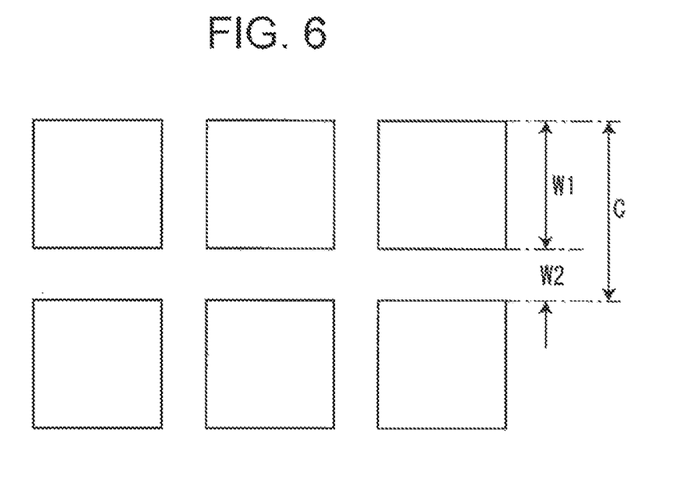
FIG. 6 is a schematic diagram for explaining a calculation expression for determining an opening ratio of a grid-shaped section in the cooking grill of the heating cooker shown in FIG. 5.

FIG. 6 is a schematic diagram for explaining a calculation expression for determining the opening ratio of the grid-shaped section 54.

As shown in FIG. 6, assuming that the diameter of each opening is defined as W1 and the width of the wire between the openings is defined as W2, a pitch C of the openings is expressed as follows: C=W1+W2.

In this case, an opening ratio F (%) is determined as follows: $F=100 \times W1^2/C^2$.

By using this opening-ratio calculation expression, the opening ratio of the grid-shaped section 54 can be determined as follows.

Assuming that an average wire diameter of the metal wires constituting the first metal wire group 52 and the second metal wire group 53 is defined as A (mm) and an average grid pitch of the first metal wire group 52 and the second metal wire group 53 is defined as B (mm), the opening ratio F (%) of the grid-shaped section 54 is expressed by expression (1) indicated below.

$$F=100 \times (B-A)^2/B^2 \quad (1)$$

The grid-shaped section 54 in the cooking grill 50 according to this embodiment has an average wire diameter A and an average grid pitch B that allow the opening ratio F to be 70% to 80% inclusive. In this range of the opening ratio F, the toasted color and the texture of the toasted bread are satisfactory.

The average grid pitch B is preferably between 10 and 20 mm. In this case, the appearance of the toasted bread can be made even more satisfactory.

(Other Configuration)

In the cooking grill 50, the corners of the support frame 51, which are located at the outer side of the grid-shaped section 54 in the planar direction, are provided with downward-protruding metal wires that protrude downward. The cooking grill 50 includes two first downward-protruding metal wires 62 and two second downward-protruding metal wires 63 as the downward-protruding metal wires. The first downward-protruding metal wires 62 are provided at two corners on one of the two diagonal lines of the support frame 51, and the second downward-protruding metal wires 63 are provided at two corners on the other diagonal line.

The first downward-protruding metal wires 62 are obtained by bending two of the parallel-arranged first metal wires 52a such that the two bent metal wires protrude downward.

As shown in FIG. 5(b), the second downward-protruding metal wires 63 have second downward-protruding metal wire ends 63a serving as opposite ends thereof that are fixed to the support frame 51 at the upper side of the first metal wire group 52, similar to the parallel-arranged second metal wires 53a. Each second downward-protruding metal wire 63 extends over one certain first metal wire 52a from one of the second downward-protruding metal wire ends 63a and intersects with the first metal wire 52a, and then bends downward. After bending downward, the second downward-protruding metal wire 63 extends below two certain first metal wires 52a and intersects with the first metal wires 52a, and then bends upward. The second downward-protruding metal wire 63 then extends over one certain first metal wire 52a and intersects with the first metal wire 52a, and then reaches the other second downward-protruding metal wire end 63a.

In a case where the cooking grill 50 is to be disposed as a food placement section on the holder frame, the first downward-protruding metal wires 62 and the second downward-protruding metal wires 63 are advantageous in that the cooking grill 50 can be stably disposed on the holder frame. Moreover, in a case where the cooking grill 50 is to be taken out from the cooking chamber 10 and is to be placed on, for example, a table, the lower side of the grid-shaped section 54 does not come into contact with the table.

(Advantages of Cooking Grill)

Accordingly, the cooking grill 50 included in the heating cooker 1B has the first metal wire group 52 and the second metal wire group 53 provided on the first metal wire group 52, and the first metal wires 52a and the second metal wires 53a constitute the grid-shaped section 54.

Consequently, the first metal wire group 52 and the second metal wire group 53 are arranged at the lower side and the upper side, respectively, without being entwined with each other, thereby achieving better cleanability.

Moreover, the opening ratio F of the grid-shaped section 54 is set to be 70% to 80% inclusive.

Consequently, in the heating cooker 1B provided with a function for feeding steam or superheated steam into a cooking chamber and heating bread by using a heater and the steam or superheated steam, a regular light-and-dark pattern can be formed on the surface of the bread, so that a toasted pattern that emphasizes the texture can be given to the surface of the bread. Furthermore, when superheated steam is to be used, the toasted pattern can be given to the surface of the bread while the heating effect by the condensation heat of the superheated steam can be enhanced.

In addition, by using the heating cooker 1B including the cooking grill 50, the bread can be satisfactorily toasted to achieve two kinds of texture, namely, a state where the surface thereof is given a toasted color with moisture removed therefrom while the inside contains moisture and is resilient.

(Confirmatory Test)

The following description relates to results obtained by performing a confirmatory test with regard to the toasted color and the texture of the bread in a case where the bread is cooked using the heating cooker 1B including the cooking grill 50 according to this embodiment.

Table 1 shows results obtained by examining the toasted color and the texture of bread toasted by using cooking grills having a grid pitch ranging between 10 and 20 mm and an opening ratio F of 50%, 60%, 70%, 80%, and 90%. The cooking grills are composed of chrome-plated iron. The two upper heaters and the two lower heaters are ceramic heaters each with an output of 350 W. In the steam generator 23, superheated steam with a temperature of 120° C. to 130° C. is generated. Bread is cooked for approximately 3 minutes by using the heaters and the superheated steam. The toasted color and the texture of the bread cooked by using each of the cooking grills having the aforementioned opening ratios F are shown in Table 1.

TABLE 1

| Opening Ratio F | Toasted Color | Texture | |
| --- | --- | --- | --- |
| 50% | Poor | Poor | Comparative Example |
| 60% | Fair | Fair | Comparative Example |
| 70% | Good | Good | Practical Example |
| 80% | Good | Good | Practical Example |
| 90% | Fair | Good | Comparative Example |

With regard to the toasted color (regular light-and-dark pattern) on the surface at the cooking-grill-side of the bread, the following criteria are used for the evaluation where "good" indicates an acceptable evaluation result.
Good: Satisfactory light-and-dark pattern
Fair: Light areas or dark areas are slightly noticeable
Poor: Light areas are noticeable In the case where the opening ratio of the cooking grill is 60%, the surface at the cooking-grill side of the bread has slightly noticeable light areas. In the case where the opening ratio of the cooking grill is 90%, the surface at the cooking-grill side of the bread has slightly noticeable dark areas.

With regard to the texture of the bread cooked by using each of the cooking grills having the aforementioned opening ratios, the following criteria are used for the evaluation where "good" indicates an acceptable evaluation result.
Good: The bread has crispy texture on the surface and sticky texture on the inside.
Fair: The crispiness of the surface of the bread is slightly low.
Poor: The crispiness of the surface of the bread is low.

As shown in Table 1, in the practical examples where the opening ratio F is between 70% and 80% inclusive, it is confirmed that the toasted color and the texture of the bread are both satisfactory.

The expression "the bread has crispy texture on the surface" means that moisture is appropriately removed (has evaporated) from the surface of the bread such that the surface of the bread provides crunchiness. The expression "the bread has sticky texture on the inside" means that moisture inside the bread is appropriately maintained before and after the bread is cooked, and that the bread has soft and resilient texture inside.

Normally, it is not easy to numerically (objectively) evaluate the toasted color and the texture by using, for example, a measuring device. Thus, as described above, the toasted color of the bread is visually evaluated and the texture of the bread is evaluated by using the sense of taste. This is because the human sense of vision and the human sense of taste are sufficient for evaluating the light-and-dark pattern of the toasted color and the texture of the bread.

Third Embodiment

Another embodiment of the present invention will be described below based on the drawings. For the sake of convenience, components having functions identical to those of the components described in the above embodiments will be given the same reference signs, and descriptions thereof will be omitted.

Normally, a heating cooker in which the cooking chamber fills with steam has a forced exhaust mechanism (for example, a high-frequency heating device described in Patent Literature 2). In such a heating cooker, the steam filled in the cooking chamber is exhausted outward via an exhaust path. However, in order to provide such a forced exhaust mechanism, the manufacturing cost of the heating cooker increases, and the heating cooker increases in size.

On the other hand, a heating cooker not having a forced exhaust mechanism has a structure in which the steam leaks outward through a gap in a door or a heating chamber. In this case, it is difficult for a user to visually determine whether white smoke coming out from the heating cooker is steam leaking from the heating chamber in a normal operational state or is caused by a failure in the heating cooker. Moreover, the steam filled in the heating chamber may cause the pressure in the heating chamber to increase, possibly causing the steam to enter an electronic component unit through small gaps.

This embodiment has been made in view of the problems mentioned above, and an object thereof is to provide a heating cooker that does not have a forced exhaust mechanism and that can reduce the possibility of misidentification of the device status by a user and can also prevent steam from entering an electronic component unit.

Figure 7:
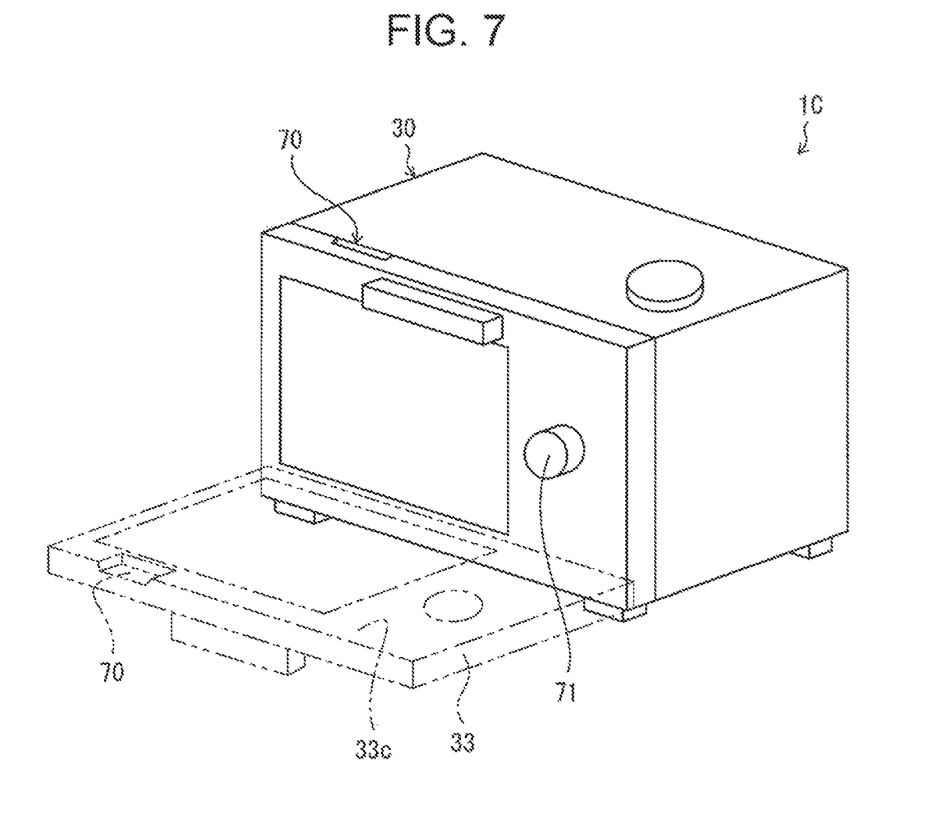
FIG. 7 is a perspective view in a case where a heating cooker according to a third embodiment of the present invention is viewed from the upper front side.

FIG. 7 is a perspective view in a case where a heating cooker 1C according to this embodiment is viewed from the upper front side. In FIG. 7, an open state of the front door 33 is indicated by a two-dot chain line.

As shown in FIG. 7, the front door 33 has a surface 33c that is located at the cooking chamber 10 side and that is provided with an exhaust section 70 that exhausts steam or superheated steam upward of the front door 33. The exhaust section 70 is a recess that is slightly recessed from other sections of the surface 33c. In the housing 30, a section that abuts on an upper section of the front door 33 when the front door 33 is closed will be defined as a front-door abutment section.

The exhaust section 70 forms a gap between the front door 33 and the front-door abutment section when the front door 33 is closed. Therefore, the steam or superheated steam in the cooking chamber 10 is preferentially exhausted from the exhaust section 70. Specifically, a location where the steam or superheated steam is exhausted can be limited, so that the possibility of misidentification of the device status by a user can be reduced.

As a result, the steam or superheated steam can be prevented from being exhausted through various gaps, such as a gap between the cooking chamber 10 and the front door 33 and a gap in the bottom-wall opening 15a, thereby preventing the steam from entering an electronic component unit.

Therefore, in the heating cooker 1C not having a forced exhaust mechanism, the possibility of misidentification of the device status by a user can be reduced, and the steam can be prevented from entering an electronic component unit.

Furthermore, it is not necessary to provide the forced exhaust mechanism as described in Patent Literature 2, so that an increase in manufacturing cost and an increase in size of the heating cooker can be avoided.

Moreover, since the front door 33 is provided with the exhaust section 70, a sense of discomfort felt by the user can be reduced.

The exhaust section 70 may be a recess provided in at least one of the inner surface of the front door 33 of the heating cooker 1C and the front surface of the cooking chamber. An operable section 71 for operating the heating cooker 1C is provided at the right side of the front surface of the heating cooker 1C as viewed from the front. The front door 33 is provided with a hole through which the operable section 71 extends. The exhaust section 70 is preferably provided in an area located farther away from the operable section 71 with reference to the center of the front door 33 in the left-right direction as a boundary. The heating cooker 1C has an electronic component unit, in which various types of electronic components are installed, in the intermural region at the side where the operable section 71 is provided. In this case, the exhaust section 70 can be positioned far away from the electronic component unit. Therefore, the steam can be further prevented from entering the electronic component unit.

CONCLUSION

A heating cooker according to a first aspect of the present invention includes: a food placement section (toasting grill 16) provided within a cooking chamber 10; a lower heating member (lower heater 17b) that is provided at a lower section within the cooking chamber 10 and that heats food (bread 16a) placed on the food placement section from below; and a steam generating unit (steam generator 23) that has a steam outlet 25 in at least one sidewall (left or right sidewall 12 or rear wall 14) of the cooking chamber 10 and that blows steam between the food placement section (toasting grill 16) and the lower heating member (lower heater 17b) from the steam outlet 25.

According to the above-described configuration, the lower heating member is provided at the lower section within the cooking chamber. The steam generating unit blows the steam between the food placement section and the lower heating member from the steam outlet.

The steam diffuses and flows throughout the cooking chamber while traveling below the food and between the food placement section and the lower heating member so as to envelop the food. Thus, the food placed on the food placement section is efficiently heated by not only the radiant heat from the lower heating member but also the condensation heat from the steam that has enveloped the food.

Then, during the food heating process, the entire surface of the food is supplied with water from the steam that has enveloped the food, so that evaporation of moisture within the food is prevented.

Consequently, the steam can be efficiently applied to the entire food, and the food can be cooked quickly. For example, bread as food can be toasted within a short period of time to provide a satisfactory texture in which the surface of the bread is given a toasted color with moisture removed therefrom while the inside contains moisture and is resilient.

Furthermore, since the steam is blown between the food placement section and the lower heating member, the steam is not directly ejected onto the lower heating member or the food within the cooking chamber. Therefore, the steam is prevented from damaging the lower heating member as a result of applying a local temperature change thereto. For example, in a case where superheated steam is to be blown out as the steam, the superheated steam is not directly ejected onto the food, so that burning of the food due to overheating is suppressed.

According to a second aspect of the present invention, the heating cooker according to the first aspect may further include a steam guide 15b that is provided at a position below the steam outlet 25 and that guides the steam, which is blown out from the steam outlet 25 and travels downward, between the food placement section (toasting grill 16) and the lower heating member (lower heater 17b).

According to the above-described configuration, the steam guide guides the steam, which is blown out from the steam outlet and travels downward, between the food placement section and the lower heating member. Therefore, contact of the steam with the lower heating member is suppressed, and the steam can be fed to the food more efficiently.

According to the third aspect of the present invention, in the heating cooker according to the first or second aspect, the steam generating unit (steam generator 23) may have a steam ejection port 23a that ejects the generated steam outward from the heating cooker and that is installed in alignment with the steam outlet 25.

According to the above-described configuration, the steam generated by the steam generating unit is directly ejected into the cooking chamber via the steam outlet without traveling through, for example, a steam feed pipe that conveys the steam. Therefore, the heating cooker does not require excessive components and can also reduce the risk of leakage of the steam to an electronic component unit as a result of breakage of, for example, a steam feed pipe. Moreover, the heating cooker can be reduced in size.

According to a fourth aspect of the present invention, in the heating cooker according to any one of the first to third aspects, the food placement section may include a cooking grill 50 on which the food is placed. The cooking grill 50 may have a first metal wire group 52 in which a plurality of first metal wires 52a are arranged and a second metal wire group 53 that is provided on the first metal wire group 52 and in which a plurality of second metal wires 53a are arranged. The first metal wire group 52 and the second metal wire group 53 may constitute a grid-shaped section 54. An opening ratio F in the grid-shaped section 54 expressed by expression (1) indicated below is 70% to 80% inclusive:

$$F = 100 \times (B-A)^2/B^2 \quad (1)$$

(where A denotes an average wire diameter of the metal wires constituting the first metal wire group and the second metal wire group, and B denotes an average grid pitch of the first metal wire group and the second metal wire group).

According to the above-described configuration, the opening ratio in the grid-shaped section is 70% to 80% inclusive. Consequently, in the heating cooker provided with a function for feeding the steam into the cooking chamber and heating the food by using the lower heating member and the steam, the steam is efficiently applied to the entire food while a regular light-and-dark pattern is satisfactorily formed on the surface of bread as the food, so that a toasted pattern that emphasizes the texture can be given to the surface of the bread. Furthermore, when superheated steam is to be used, the heating effect by the condensation heat of the superheated steam can be enhanced, so that the food can be heated more efficiently.

Furthermore, the first metal wire group and the second metal wire group are arranged at the lower side and the upper side, respectively, without being entwined with each other, thereby achieving better cleanability.

According to a fifth aspect of the present invention, the heating cooker according to any one of the first to fourth aspects may further include an openable-closable door (front door 33) that opens and closes the cooking chamber 10. An exhaust section 70 that exhausts the steam may be provided at an upper position between the openable-closable door (front door 33) and a front surface of the cooking chamber 10. The exhaust section 70 may be a recess provided in at least one of an inner surface of the openable-closable door (front door 33) and the front surface of the cooking chamber 10.

According to the above-described configuration, the exhaust section forms a gap at the upper position between the openable-closable door and the front surface of the cooking chamber when the openable-closable door is closed. Therefore, the steam in the cooking chamber is preferentially exhausted from the exhaust section. Specifically, a location where the steam is exhausted can be limited, so that the possibility of misidentification of the device status by a user can be reduced.

As a result, the steam can be prevented from being exhausted through various gaps, such as a gap between the cooking chamber and the openable-closable door. The steam filled in the cooking chamber does not cause the pressure in the cooking chamber to increase, so that the steam can be prevented from entering the electronic component unit through small gaps.

Consequently, a heat heating device not having a forced exhaust mechanism can be provided in which the possibility of misidentification of the device status by a user can be reduced, and in which the steam can be prevented from entering the electronic component unit.

According to a sixth aspect of the present invention, the heating cooker according to the fifth aspect may further include an operable section 71 provided at a side of the openable-closable door (front door 33) on a front surface of the heating cooker. The exhaust section 70 is provided in an area located farther away from the operable section 71 with reference to a center of the openable-closable door (front door 33) in a left-right direction as a boundary.

According to the above-described configuration, the exhaust section can be positioned far away from the electronic component unit provided in an intermural region at the side where the operable section is provided. Therefore, the steam can be further prevented from entering the electronic component unit.

According to a seventh aspect of the present invention, the heating cooker according to the sixth aspect may further include an openable-closable door (front door 33) that opens and closes the cooking chamber 10, and a food-placement-section driver (driving mechanism 40) that moves the food placement section (toasting grill 16, holder frame 16b, cooking grill 50) so as to draw the food placement section out from the cooking chamber 10 in accordance with an opening operation of the openable-closable door (front door 33) and to return the food placement section into the cooking chamber 10 in accordance with a closing operation of the openable-closable door (front door 33).

According to the above-described configuration, the food-placement-section driver can move the food placement section forward and rearward. Therefore, the food placement section advances forward when the openable-closable door is opened. As a result, food can be readily placed on the food placement section, and the food placement section can be readily replaced with another one.

The present invention is not limited to the embodiments described above, and various modifications are possible within the scope described in the claims. An embodiment obtained by appropriately combining technical means disclosed in different embodiments is also included in the technical scope of the present invention. Moreover, a new technical feature can be formed by combining technical means disclosed in the embodiments.

REFERENCE SIGNS LIST 1A to 1C heating cooker
10 cooking chamber
12 sidewall (at least one sidewall)
14 rear wall (at least one sidewall)
15b steam guide
16 toasting grill (food placement section)
16a bread (food)
16b holder frame (food placement section)
17a upper heater (upper heating member)
17b lower heater (lower heating member)
23 steam generator (steam generating unit)
23a steam ejection port
25 steam outlet
33 front door (openable-closable door)
40 driving mechanism (food-placement-section driver)
50 cooking grill
52 first metal wire group
52a first metal wire
53 second metal wire group
53a second metal wire
54 grid-shaped section
70 exhaust section
71 operable section

The invention claimed is:
1. A heat cooking device comprising:
a food placement section provided within a cooking chamber;
a lower heating member that is provided at a lower section within the cooking chamber and that heats food placed on the food placement section from below;
a steam generating unit that has a steam outlet in at least one sidewall of the cooking chamber and that blows steam between the food placement section and the lower heating member from the steam outlet,
and a steam guide that is provided at a position below the steam outlet and that guides the steam, which is blown out from the steam outlet and travels downward, between the food placement section and the lower heating member, wherein the steam guide has a flat surface extending horizontally from a bottom rear wall toward a front of the cooking chamber.

2. The heat cooking device according to claim 1,
wherein the steam generating unit has a steam ejection port that ejects the generated steam outward from the heating cooker and that is installed in alignment with the steam outlet.

3. The heat cooking device according to claim 1,
wherein the food placement section includes a cooking grill on which the food is placed,
wherein the cooking grill has a first metal wire group in which a plurality of first metal wires are arranged and a second metal wire group that is provided on the first metal wire group and in which a plurality of second metal wires are arranged, and wherein the first metal wire group and the second metal wire group constitute a grid-shaped section, and
wherein an opening ratio F in the grid-shaped section expressed by expression (1) indicated below is 70% to 80% inclusive:

$$F = 100 \times (B-A)^2/B^2 \qquad (1)$$

(where A denotes an average wire diameter of the metal wires constituting the first metal wire group and the second metal wire group, and B denotes an average grid pitch of the first metal wire group and the second metal wire group).

4. The heat cooking device according to claim 1, further comprising:
an openable-closable door that opens and closes the cooking chamber; and
a food-placement-section driver that moves the food placement section so as to draw the food placement section out from the cooking chamber in accordance with an opening operation of the openable-closable door and to return the food placement section into the cooking chamber in accordance with a closing operation of the openable-closable door.

5. A heat cooking device comprising:
a food placement section provided within a cooking chamber;
a lower heating member that is provided at a lower section within the cooking chamber and that heats food placed on the food placement section from below;
a steam generating unit that has a steam outlet in at least one sidewall of the cooking chamber and that blows steam between the food placement section and the lower heating member from the steam outlet; and
an openable-closable door that opens and closes the cooking chamber,
wherein an exhaust section that exhausts the steam is provided at an upper position between the openable-closable door and a front surface of the cooking chamber, and
wherein the exhaust section is a recess provided in at least one of an inner surface of the openable-closable door and the front surface of the cooking chamber.

6. The heat cooking device according to claim 5, further comprising:
an operable section provided at a side of the openable-closable door on a front surface of the heat cooking device,
wherein the exhaust section is provided in an area located farther away from the operable section with reference to a center of the openable-closable door in a left-right direction as a boundary.

\* \* \* \* \*